United States Patent [19]

Le Fol

[11] Patent Number: 4,767,106
[45] Date of Patent: Aug. 30, 1988

[54] HYDROELASTIC SUPPORT, IN PARTICULAR FOR A VEHICLE ENGINE

[75] Inventor: Marcel Le Fol, Chateaugiron, France

[73] Assignees: Automobiles Peugeot, Paris; Automobiles Citroen, Neuilly, both of France

[21] Appl. No.: 18,471

[22] Filed: Feb. 25, 1987

[30] Foreign Application Priority Data

Feb. 25, 1986 [FR] France ................... 86 02581

[51] Int. Cl.$^4$ ............................................. F16F 9/10
[52] U.S. Cl. .................................. 267/140.1; 248/562; 248/636
[58] Field of Search ............... 267/140.1, 35, 141.4, 267/141.5, 195, 219; 248/562, 638, 636; 188/298; 180/300, 312, 902

[56] References Cited

U.S. PATENT DOCUMENTS

| | | | |
|---|---|---|---|
| 2,226,388 | 12/1940 | Richter | 74/607 |
| 2,387,066 | 10/1945 | Harding | 267/134 |
| 2,540,130 | 2/1951 | Lee . | |
| 3,202,388 | 8/1965 | Goodwin | 248/636 |
| 3,586,403 | 6/1971 | Cooley | 308/187.1 |
| 3,651,902 | 3/1972 | Peddinghaus . | |
| 3,731,771 | 5/1973 | Borgo | 188/289 |
| 3,795,390 | 3/1974 | Kendall et al. | 267/33 |
| 3,958,654 | 5/1976 | Le Salver et al. | 180/64 F |
| 3,970,162 | 7/1976 | Le Salver et al. | 180/64 R |
| 4,054,277 | 10/1977 | Sirven | 267/35 |
| 4,159,091 | 6/1979 | Le Salver et al. | 248/562 |
| 4,215,842 | 8/1980 | Brenner et al. | 248/562 |
| 4,262,886 | 4/1981 | Le Salver et al. | 267/141 |
| 4,277,056 | 7/1981 | Ticks | 267/140.1 |
| 4,319,768 | 3/1982 | Youngdale | 280/668 |
| 4,336,968 | 6/1982 | Hibner | 308/26 |
| 4,422,779 | 12/1983 | Hamaekers et al. | 384/99 |
| 4,519,211 | 5/1985 | Sedille et al. | 60/602 |
| 4,568,069 | 2/1986 | Poupard | 267/140.1 |
| 4,588,173 | 5/1986 | Gold et al. | 267/140.1 |
| 4,632,370 | 12/1986 | Ticks et al. | 267/140.1 |

FOREIGN PATENT DOCUMENTS

| | | |
|---|---|---|
| 0014742 | 9/1980 | European Pat. Off. . |
| 0027751 | 4/1981 | European Pat. Off. . |
| 0036470 | 9/1981 | European Pat. Off. . |
| 0044908 | 2/1982 | European Pat. Off. . |
| 0072262 | 2/1983 | European Pat. Off. . |
| 0071698 | 7/1985 | European Pat. Off. . |
| 0163817 | 12/1985 | European Pat. Off. . |
| 0183267 | 6/1986 | European Pat. Off. ............ 248/562 |
| 547194 | 2/1934 | Fed. Rep. of Germany . |
| 728501 | 11/1942 | Fed. Rep. of Germany . |
| 1625389 | 7/1970 | Fed. Rep. of Germany . |
| 7407909 | 5/1977 | Fed. Rep. of Germany . |
| 2948408 | 6/1981 | Fed. Rep. of Germany . |

(List continued on next page.)

OTHER PUBLICATIONS

Report "Theory of the Hydraulically Damped Motor Mount with a Long Nozzle".
Report Comparing Motor Mounts (with English translation).
Drawing dated Oct. 5, 1979 with attachments.
Freudenberg drawing 10780 dated Nov. 5, 1979.
"The Use of Engine Mounts with Integrated Hydraulic Damping in Passenger Cars", presented by Le Salver, 1983.

Primary Examiner—Andres Kashnikow
Assistant Examiner—Mark T. Le
Attorney, Agent, or Firm—Burns, Doane, Swecker & Mathis

[57] ABSTRACT

The support is particularly compact, simple in construction and very reliable in operation. It comprises a main composite unit (1) comprising a first fixing element (3) and a mass of elastic material (2), this mass forming, on one hand, a massive portion (6) of a roughly frusto-conical general shape disposed between the first fixing element (3), part of this main unit between the two armatures (4, 5) being gripped between a housing (8) and a cover (9) fixed to each other and constituting a second fixing element. The housing defines with the elastic mass a work chamber (11), an expansion chamber (12) and a communication passageway (13) interconnecting with the chambers.

11 Claims, 2 Drawing Sheets

FOREIGN PATENT DOCUMENTS

| | | |
|---|---|---|
| 926846 | 10/1947 | France . |
| 1242350 | 1/1961 | France . |
| 1336186 | 7/1963 | France . |
| 1380784 | 10/1964 | France . |
| 1540380 | 10/1968 | France . |
| 1549300 | 11/1968 | France . |
| 2349066 | 11/1977 | France . |
| 2394715 | 1/1979 | France . |
| 2435632 | 4/1980 | France . |
| 2547378 | 6/1984 | France . |
| 2555272 | 5/1985 | France . |
| 172743 | 2/1984 | Japan . |
| 176802 | 10/1985 | Japan . |
| 208652 | 10/1985 | Japan . |
| 811748 | 4/1959 | United Kingdom . |
| 2041485 | 9/1980 | United Kingdom . |
| 2041486 | 9/1980 | United Kingdom . |
| 2086530 | 5/1982 | United Kingdom . |
| 2166516 | 5/1986 | United Kingdom . |

HYDROELASTIC SUPPORT, IN PARTICULAR FOR A VEHICLE ENGINE

The present invention relates to a hydroelastic support for interconnecting two assemblies which must be insulated from each other, these two assemblies being for example an engine drive unit and the structure of a motor vehicle.

It is known that in motor vehicles, the supports used for the suspension of the engine drive unit must ensure both a good filtration of the vibrations at high frequency and low amplitude due to imperfections in the balancing of the engine, and a good damping of the trembling at high frequency and low amplitude coming from the road.

This double result may be obtained, in the known manner, with a support of the type comprising two chambers filled with liquid partly defined by elastic walls interconnected through a communication passageway.

Such an arrangement is known from the document DE-No. 2948.408 in which one of the two chambers is defined by a flexible membrane maintained by a collar on one of the armatures. Such a membrane is very vulnerable and presents a serious risk of deterioration.

An object of the invention is to provide a support of the type defined hereinbefore which, as compared to known supports, has, in particular, the following advantages:

the support comprises only a single element having a moulded part of elastic material;

it has a small overall height;

the thin walls of elastic material are perfectly protected by rigid parts.

The invention therefore concerns a hydroelastic support comprising first and second fixing elements each of which is adapted to be fixed to one of the two assemblies to be insulated from each other, these two elements being separated by a mass of elastic material defining a work chamber and an expansion chamber filled with liquid and interconnected through a communication passageway.

This support comprises a main unit which is composite and includes the first fixing element and the mass of elastic material, said mass being formed, on one hand, by a massive part having a roughly frustoconical general shape disposed between said first fixing element and an intermediate armature and, on the other hand, an annular membrane disposed between the intermediate armature and an outer armature, the peripheral portion of said main unit between the two armatures being gripped between a housing and a cover fixed together and constituting the second fixing element, the housing defining with the elastic mass the two chambers and the communication passageway interconnecting the latter.

According to other features:

the housing has a stepped shape and includes a bottom of smaller diameter which partly defines the work chamber and the communication passageway, and an annular part which partly defines the expansion chamber;

the intermediate armature includes at least one notch in the region of which the elastic mass has a reduced thickness so as to form a thin wall between the work chamber and the expansion chamber;

the mass of elastic material has a central boss which is cooperative with the bottom of the housing so as to limit the movements of the support in the axial compression direction;

the cover has an extension in the direction of the first fixing element which is cooperative with the mass of elastic material so as to limit the movements of the support in the axial extension direction and in any transverse direction.

An embodiment of the invention will now be described in the following description with reference to the accompanying drawings, in which.

Figure 6:
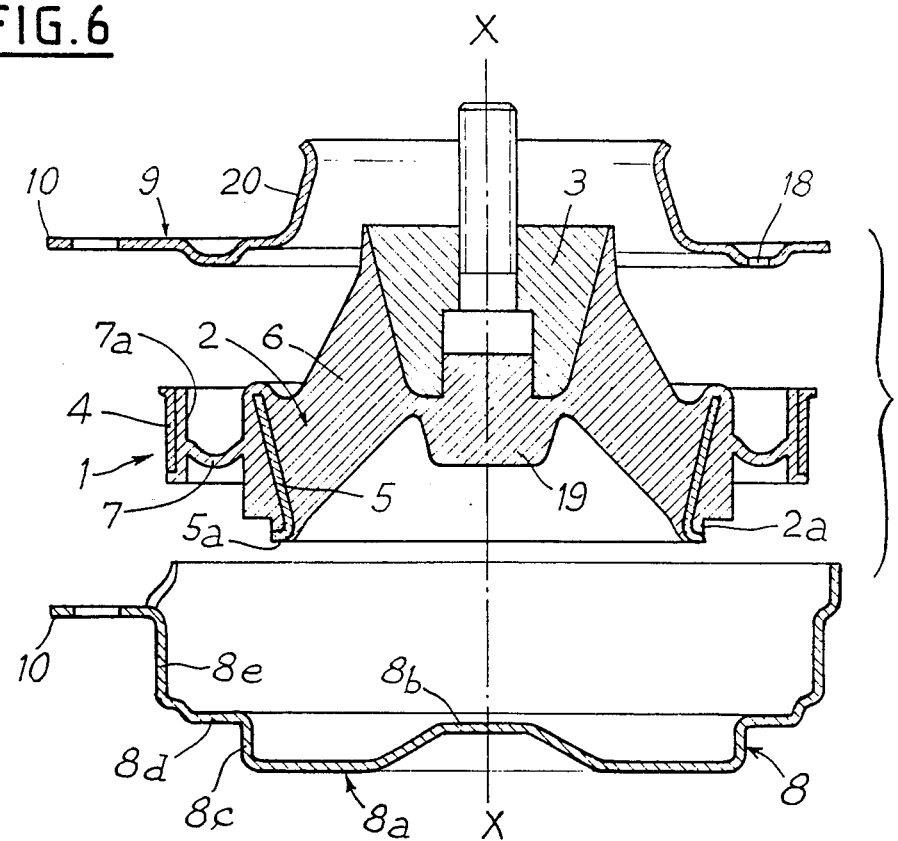
FIG. 6 is an exploded sectional view of the component parts of the support.
Figure 7:
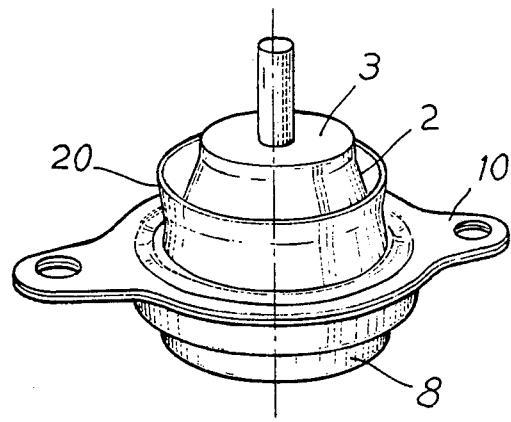
FIG. 7 is a perspective view of the complete support.

The illustrated support comprises a main composite unit 1 (FIG. 6) formed by a mass 2 of an elastic material bonded or vulcanized to a first fixing element 3, to an outer armature or plate 4 having a general cylindrical shape, and to an inner armature or plate 5 having, in the presently-described embodiment, a generally frustoconical shape, the lower edge of which is bent outwardly at 5a.

The mass 2 forms, on one hand, a massive part 6 of generally frustoconical shape disposed between the first fixing element 3 and the intermediate armature 5 and, on the other hand, an annular membrane 7 disposed between the intermediate armature 5 and the outer armature 4. This membrane 7 forms at least one wave or corrugation so as to avoid opposing its movements in a direction parallel to the axis X—X of the support. It extends along a mean plane perpendicular to the axis X—X and terminates on the outside in a cylindrical skirt 7a bonded or vulcanized to the armature 4.

The other component parts of the support comprise a housing 8 and a cover 9. The peripheral portion of the main unit 1 between the intermediate armature 5 and the outer armature 4 is gripped between the housing 8 and the cover 9 which are interconnected by a setting operation on the major part of their periphery, while defining fixing lugs 10. This assembly is achieved in the conventional manner while immersed in an anti-freeze liquid.

The housing has a stepped shape so as to define a bottom wall 8a including optionally a raised central portion 9b, an axial portion 8c in contact by its upper edge with the mass 6, an annular portion 8d in facing relation to the membrane 7 and an edge portion 8e fixed to the cover 9.

The assembly formed by the housing 8 and the cover 9 constitutes a second fixing element of the support.

With the component parts 1, 8 and 9 assembled, a first work chamber 11 is defined mainly by the housing 8 and the frustoconical portion 6 of the elastic mass, while a second expansion chamber 12 of annular shape is defined between this housing 8 and the membrane 7.

Figure 1:
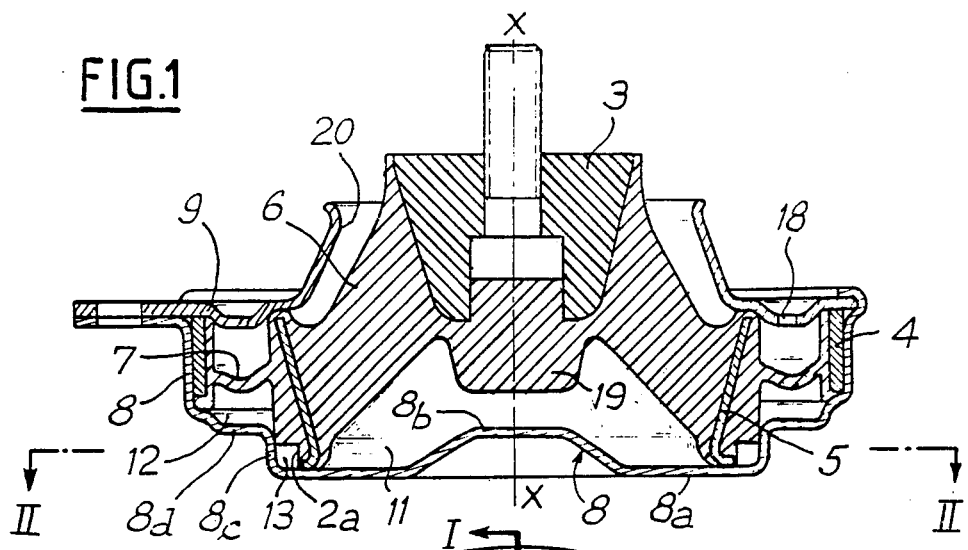
FIG. 1 is an axial sectional view taken on line I—I of FIG. 2.
Figure 2:
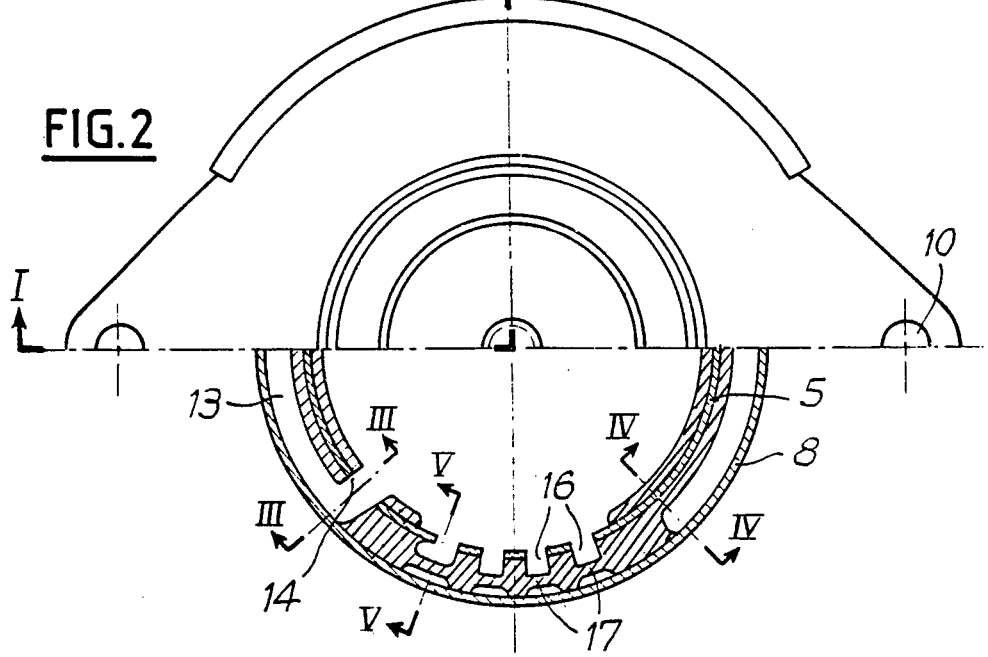
FIG. 2 is a semi-plan view and a semi-sectional view taken on line II—II of FIG. 1.
Figure 3:
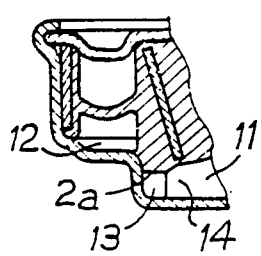
FIG. 3 is a partial sectional viewn taken on line III—III of FIG. 2.
Figure 4:
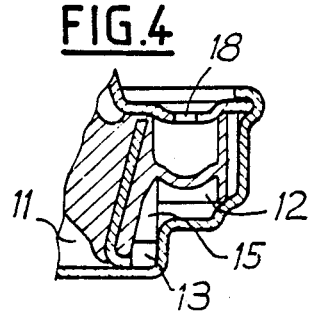
FIG. 4 is a partial sectional view taken on line IV—IV of FIG. 2.

A passageway 13 of communication between the chambers 11 and 12 is also formed between the housing 8 and a step or rabbet 2a in the elastic mass 2. This passageway opens onto the chamber 11 through a passageway 14 provided in the mass 2 and the armature 5 (FIGS. 2 and 3) and, onto the chamber 12, through a passageway 15 provided in the mass 2 (FIG. 4). In the presently-described embodiment, the passageway 13 subends an angle at the centre of the support of about 270°. These dimensional features need not be described in detail since the principle and the calculation of such supports are well known in the art.

Figure 5:
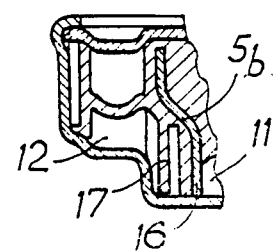
FIG. 5 is a partial sectional view taken on line V—V of FIG. 2.

Between the two apertures 14 and 15 on the opposite side of the passageway 13, the intermediate armature 5 has notches 16 in the region of which the elastic mass 2 is reduced to thin walls 17 (FIGS. 2 and 5) thus separating the chambers 11 and 12. These thin walls perform the function of movable partition walls having a limited displacement between the two chambers. The armature 5 is deformed in this region 5b (FIG. 5) and has an S- or Z-shaped section so as to provide sufficient space on each side of the walls 17.

The cover 9 is provided with at least one opening, such as 18, to permit the passage of air when the membrane 7 moves.

A central boss 19 in one piece with the elastic mass 2 acts as an abutment or stop for limiting the movements in the vertical compression direction by cooperation with the bottom wall 8b of the housing 8.

An extension 20 of generally frustoconical shape of the cover 9 acts as a movement limiting means by cooperation with the elastic mass 2 in the vertical extension direction and in any transverse direction.

The advantages of such a support are the following:

it is of simplified construction, since it has only a single element having a moulded part of elastic material;

it is of particularly small overall height;

the thin walls 7 and 17 are perfectly protected by the metal parts;

the movable wall or walls 17 are obtained without addition of an additional part;

it is provided with movement limiting means in all directions, here again with no need for additional parts.

What is claimed is:

1. A hydroelastic support comprising a first fixing element and a second fixing element for fixing respectively to two assemblies to be insulated from each other, a mass of elastic material interposed between and separating said two elements and cooperating with said second fixing element to define a work chamber and an expansion chamber which are filled with liquid, and a communication passageway interconnecting said work and expansion chambers, said second fixing element including a housing and a cover which are fixed to each other, said support further comprising an outer armature and an intermediate armature, a single composite main unit including said first fixing element and said mass of elastic material, said mass forming a massive portion having a roughly frustoconical general shape disposed between said first fixing element and said intermediate armature, said mass further forming an annular membrane disposed between said intermediate armature and said outer armature, a peripheral portion of said main unit between said two armatures being gripped between said housing and said cover, said housing defining with said elastic mass said two chambers and said communication passageway, said expansion chamber being disposed annularly around said working chamber.

2. A hydroelastic support according to claim 1, wherein said annular membrane extends substantially radially relative to an axis of the support between a periphery of said massive part of said mass of elastic material and a cylindrical skirt which is bonded or vulcanized to said outer armature which also has a cylindrical shape.

3. A hydroelastic support according to claim 1, wherein said housing has a stepped shape and includes a bottom wall of smaller diameter which partly defines said work chamber and said communication passageway, and an annular portion which partly defines said expansion chamber.

4. A hydroelastic support comprising a first fixing element and a second fixing element for fixing respectively to two assemblies to be insulated from each other, a mass of elastic material interposed between and separating said two elements and defining a work chamber and an expansion chamber which are filled with liquid, and a communication passageway interconnecting said work and expansion chambers, said second fixing element including a housing and a cover which are fixed to each other, said support further comprising an outer armature and an intermediate armature, a composite main unit including said first fixing element and said mass of elastic material, said mass forming a massive portion having a roughly frustoconical general shape disposed between said first fixing element and said intermediate armature, said mass further forming an annular membrane disposed between said intermediate armature and said outer armature, a peripheral portion of said main unit between said two armatures being gripped between said housing and said cover, said housing defining with said elastic mass said two chambers and said communication passageway;

wherein said housing has a stepped shape and includes a bottom wall of smaller diameter which partly defines said work chamber and said communication passageway, and an annular portion which partly defines said expansion chamber; and wherein said mass of elastic material includes in a portion thereof facing toward said bottom wall of said housing, a step extending on a portion of the periphery thereof and partly defining said communication passageway, which passageway is connected at one end thereof to said work chamber through an aperture provided in said mass of elastic material and in said intermediate armature and, at an opposite end of said passageway to said expansion chamber through an aperture in said mass of elastic material.

5. A hydroelastic support comprising a first fixing element and a second fixing element for fixing respectively to two assemblies to be insulated from each other, a mass of elastic material interposed between and separating said two elements and defining a work chamber and an expansion chamber which are filled with liquid, and a communication passageway interconnecting said work and expansion chambers, said second fixing element including a housing and a cover which are fixed to each other, said support further comprising an outer armature and an intermediate armature, a composite main unit including said first fixing element and said mass of elastic material, said mass forming a massive portion having a roughly frustoconical general shape disposed between said first fixing element and said intermediate armature, said mass further forming an annular membrane disposed between said intermediate armature and said outer armature, a peripheral portion of said main unit between said two armatures being gripped between said housing and said cover, said housing defining with said elastic mass said two chambers and said communication passageway
   wherein said intermediate armature has at least one notch in the region of which notch said elastic mass has a reduced thickness so as to form a thin wall between said work chamber and said expansion chamber.

6. A hydroelastic support according to claim 5, wherein at least in the place of said notch, said intermediate armature has an S-sectional shape.

7. A hydroelastic support according to claim 5, wherein at least in the place of said notch, said intermediate armature has a Z-sectional shape.

8. A hydroelastic support according to claim 1, wherein said mass of elastic material comprises a central boss which is cooperative with said bottom wall of said housing for limiting the movements of the support in an axial direction of compression of the support.

9. A hydroelastic support according to claim 1, wherein said cover includes an extension which extends in the direction of said first fixing element and is cooperative with said mass of elastic material so as to limit movements of the support in an axial direction of extension of the support and in any transverse direction.

10. A hydroelastic support according to claim 1, wherein said cover includes at least one opening putting a volume defined between said cover and said membrane in communication with the surrounding open air.

11. A hydroelastic support according to claim 1, wherein said intermediate armature has a generally frustoconical shape.

* * * * *